US00RE36863E

United States Patent [19]

Snyder

[11] E Patent Number: Re. 36,863

[45] Reissued Date of Patent: Sep. 12, 2000

[54] COMBINATION SATELLITE DISH WITH UHF/VHF ANTENNA

[75] Inventor: Donald L. Snyder, Battle Creek, Mich.

[73] Assignee: Barker Manufacturing Co., Inc., Battle Creek, Mich.

[21] Appl. No.: 09/421,691

[22] Filed: Oct. 20, 1999

Related U.S. Patent Documents

Reissue of:

[64] Patent No.: 5,929,818
Issued: Jul. 27, 1999
Appl. No.: 08/858,388
Filed: May 19, 1997

U.S. Applications:

[60] Provisional application No. 60/017,945, May 20, 1996.

[51] Int. Cl.[7] ..... H01Q 21/00

[52] U.S. Cl. ..... 343/725; 343/727; 343/729

[58] Field of Search ..... 343/725, 727, 343/729, 730, 882, 892; H01Q 21/00

[56] References Cited

U.S. PATENT DOCUMENTS

| | | | |
|---|---|---|---|
| 2,846,678 | 8/1958 | Best | 343/727 |
| 5,604,508 | 2/1997 | Atkinson | 343/879 |
| 5,606,334 | 2/1997 | Amarillas et al. | 343/840 |
| 5,708,963 | 1/1998 | Mobley et al. | 455/12.1 |

*Primary Examiner*—Hoanganh Le
*Assistant Examiner*—Hoang Nguyen
*Attorney, Agent, or Firm*—Young & Basile, P.C.

[57] ABSTRACT

A combination satellite television signal receiving antenna and a UHF/VHF antenna, particularly suitable for use with recreational vehicles. The satellite antenna is mounted for both horizontal and vertical adjustment having a circular periphery and the UHF/VHF dipole antenna is attached thereto and is of an arcuate configuration defining a portion of a circle concentric to the satellite receiving antenna dish configuration. The television and UHF/VHF antenna are mounted for simultaneous adjustment.

5 Claims, 2 Drawing Sheets

COMBINATION SATELLITE DISH WITH UHF/VHF ANTENNA

Matter enclosed in heavy brackets [ ] appears in the original patent but forms no part of this reissue specification; matter printed in italics indicates the additions made by reissue.

CROSS REFERENCE TO CO-PENDING APPLICATION

This application claims the benefit of U.S. Provisional Application Serial No. 60/017,945 filed May 20, 1996.

BACKGROUND OF THE INVENTION

1. Field of the Invention

The invention pertains to television antennas receiving satellite signals and UHF/VHF antennas, mounted upon a common support.

2. Description of the Related Art

Recreational vehicles containing television sets and AM/FM receivers commonly employ separate externally located roof mounted antennas capable of vertical and horizontal adjustment from within the vehicle to permit the antenna to be positioned for optimum signal receiving. Typical recreational vehicle antenna systems are shown in U.S. Pat. Nos. 3,665,477; 3,739,387 and 4,663,632.

The latest technology in television receiving signals utilize small reflective dishes which are directed toward a stationary satellite, such systems being called Digital Satellite Systems. As such dish type antenna must be pointed toward the satellite transmitter, the dish is, preferably, mounted upon the exterior of a recreational vehicle roof and associated with operating structure internally located wherein the dish may be raised and lowered between travel and operative positions, and may be rotated and titled to the desired position for optimum signal reception.

UHF/VHF antennas normally consist of a dipole arrangement of considerable length, and are usually of a linear configuration. Disposing the length of the dipole antenna at right angles to the signal permits optimum signal strength to be received, and in the past, it has been common to mount recreational vehicle UHF and VHF antennas for both elevatable and retractable adjustment, as well as being rotatably positionable.

Television antennas and UHF/VHF antennas are mounted upon separately operated mechanisms, and duplicate operating systems are expensive, and occupy an inordinate portion of the vehicle roof area. Previously, a successful combining of a television satellite receiving antenna system and a UHF/VHF antenna has not been available.

OBJECTS OF THE INVENTION

It is an object of the invention to combine a satellite dish television receiving antenna with a UHF/VHF antenna whereby both antennas may be simultaneously adjusted and directed.

A further object of the invention is to provide a combination satellite dish and UHF/VHF antenna for use with recreational vehicles wherein the combined antennas are of a concise configuration and may be simultaneously directionally adjusted by common operating mechanism located within the vehicle interior.

SUMMARY OF THE INVENTION

The operating mechanism for the combination television receiving satellite dish and the UHF/VHF antenna in accord with the invention is preferably located upon the roof of a recreational vehicle on the underside of the vehicle ceiling wherein the antenna structure may be both elevatable and retractable, and rotatable about a vertical axis from within the vehicle.

The exteriorly mounted components of the antenna system located directly above the interiorly operated controls, includes a linkage system wherein the satellite dish, which is of a circular and generally flat configuration, is pivotally mounted for tilting between raised and lowered positions. In the raised position, the antenna dish is in its operable condition, while it is lowered during vehicle travel.

A UHF/VHF dipole antenna system is mounted upon the satellite dish support, and satellite dish, and is of a closed loop configuration of arcuate form so as to be generally concentric to the circular periphery of the satellite antenna. In this manner, the complementary configuration between the two antenna systems produces a concise attractive total antenna system permitting both antennas to be simultaneously raised, lowered and rotated, and only a single set of controls is necessary to install and operate when it is desired to position either the television or UHF/VHF antennas.

The mounting of the UHF/VHF antenna adjacent a portion of the dish periphery permits the bipolar antenna to protect a portion of the satellite dish, while the satellite dish will also partially protect the UHF/VHF antenna.

The practice of the invention permits a number of economies of manufacture to be achieved, as well as reducing installation costs, and the invention permits a variety of antenna systems to be economically made available.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
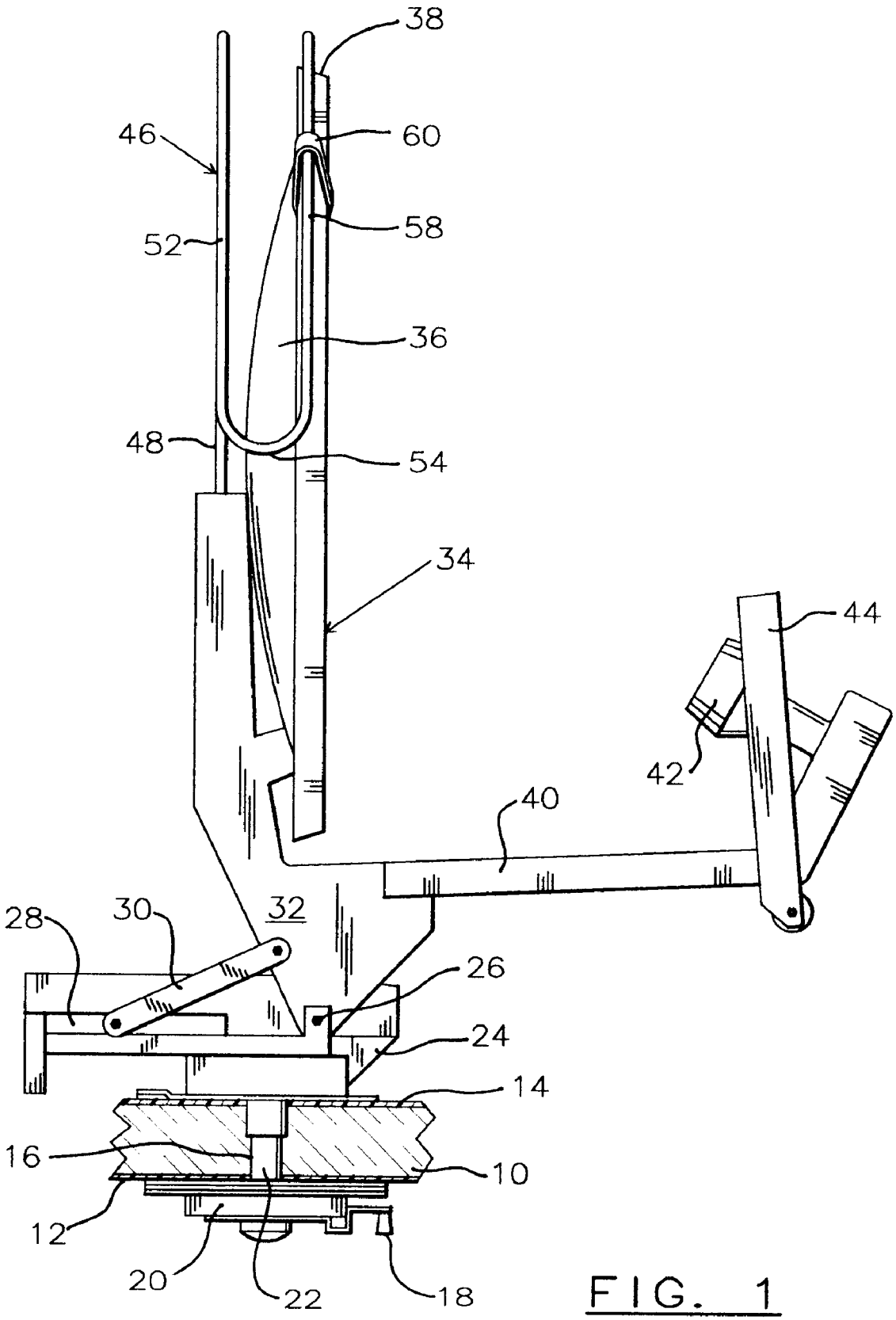
FIG. 1 is a side elevational view, partially sectioned, showing an antenna system in accord with the invention in a raised operative position.

With reference to FIG. 1, the ceiling or roof of a recreational vehicle is indicated at 10, and includes an inside surface 12 and an outside roof surface 14. A hole 16 extends through the roof 10, and a crank 18 and an adjustment wheel 20 located adjacent the inside surface 12 respectively elevate and rotate the antenna structure mounted upon concentric shafts 22 extending through the hole 16.

The antenna support 24 is connected to the upper portion of the shaft 22 and includes a pivot 26, a horizontally disposed track 28 in which a screw mechanism is located, and the nut on the screw mechanism includes a link 30. The satellite antenna is supported upon a base 32 mounted upon pivot 26, and the link 30 is pivotally attached to the base 32 above the pivot 26 whereby movement of the linkage 30 will raise and lower the base 32 about pivot 26.

The television satellite signal receiving dish 34 is mounted upon the base 32 and includes a shell 36 of a concave/convex configuration, as is well known. The periphery of the shell 36 is circular, as will be appreciated from FIGS. 2 and 3, and with Digital Satellite Systems, the diameter of the dish 34 may not need by any larger than about eighteen inches.

An arm 40 is mounted upon the base 32 and extends forwardly of the dish 34 for supporting the receiver 42 located at a focal point of the signals reflected off the dish shell 36. A U-shaped guard 44 extends about the receiver 42 for protecting the receiver.

Figure 3:
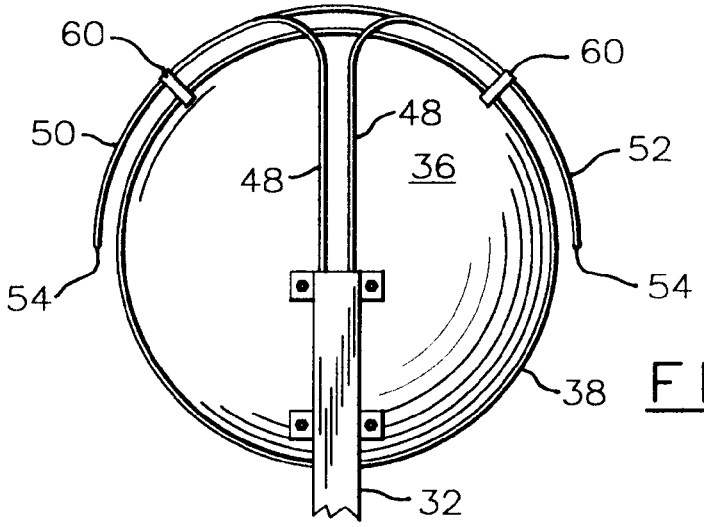
FIG. 3 is a rear view of the antenna system.
Figure 4:
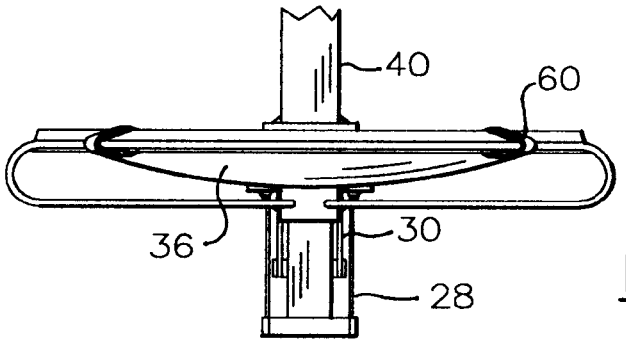
FIG. 4 is a top plan view of the antenna system in accord with the invention.

The UHF/VHF antenna is generally indicated at 46, and includes dipoles 48. FIG. 3, which extend upwardly from the base 32 and are bent away from each other adjacent the upper periphery of the dish 34 into portions 50 and 52 as will be appreciated from FIG. 3.

The UHF/VHF antenna portions 50 and 52 are bent into U-configurations at their lowermost portions 54, FIG. 1, and extend upwardly in portions 56 and 58 wherein the portions 58 and 60 will be interconnected at their uppermost region. Supports 60 interposed between the portion 58 and the shell periphery 38, and the portion 56 and the shell periphery 38 support the upper region of the UHF/VHF antenna.

Figure 2:
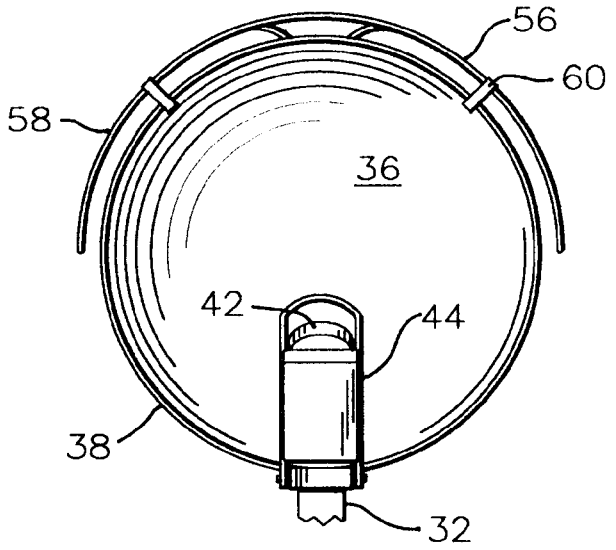
FIG. 2 is a front elevational view of the antenna system when raised, the operating structure not being illustrated.

The antenna portions 52 and 58 and 50 and 56 are in alignment, as will be appreciated from FIGS. 2 and 3, and the curved antenna portions 50, 52, 56 and 58 are of a circular configuration concentric to the configuration of the dish shell periphery 38. In this manner, an attractive relationship between the dish 34 and the antenna 46 is maintained, and of course, as the antenna 46 is wholely mounted on the base 32, the antenna 46 will be adjusted vertically and rotatably by operation of the crank 18 and wheel 20, respectively, so that the strongest signal may be received.

The mounting of the antenna 46 in the disclosed manner also permits the antenna curved portions to protect the outer periphery of the dish 34, while in turn, the support of the antenna 46 on the shell provides protection and rigidity to the antenna 46.

The combination of the television signal receiving dish 34 with the UHF/VHF antenna 46 eliminates the necessity for installing separate antennas, and the economies and ease of installation of the invention provides significant advantages over the prior art.

It is appreciated that various modifications to the inventive concepts may be apparent to those skilled in the art without departing from the spirit and scope of the invention.

I claim:

1. In combination, a dish antenna for receiving television signals, adjustable support means supporting said dish antenna for adjustment relative to the direction of transmitted signals, a substantially circular periphery defined on said dish antenna, and a UHF/VHF antenna [mounted upon said support means] located adjacent said dish antenna periphery having a *substantially* circular shape conforming to the configuration of said dish antenna periphery and having the same center of curvature as that of said dish antenna periphery for simultaneous directional adjustment with said dish antenna.

2. In a combination as in claim 1, said UHF/VHF antenna comprising a dipole antenna having first and second spaced elements.

3. In combination, a dish antenna for receiving television signals, adjustable support means supporting said dish antenna for adjustment relative to the direction of transmitted signals, a *substantially* circular periphery defined on said dish antenna, and a UHF/VHF dipole antenna having a pair of ends and a central region, said central region being of a *substantially* circular configuration corresponding to said dish antenna periphery, [said dipole antenna ends being affixed to said adjustable support means,] and support brackets supporting said dipole antenna central region adjacent said dish antenna periphery.

4. In a combination as in claim 3, said support brackets being affixed to said dish antenna periphery.

5. In a combination as in claim 4, said dipole antenna having first and second spaced elements, said support brackets being attached to said first element.

* * * * *